United States Patent
Gaddam et al.

(10) Patent No.: US 8,503,488 B2
(45) Date of Patent: Aug. 6, 2013

(54) PACKET INSERTION MECHANISM FOR AN IMPROVED ATSC DTV SYSTEM

(75) Inventors: Vasanth R. Gaddam, Ossining, NY (US); Dagnachew Birru, Yorktown Heights, NY (US)

(73) Assignee: Koninklijke Philips N.V., Eindhoven (NL)

( * ) Notice: Subject to any disclaimer, the term of this patent is extended or adjusted under 35 U.S.C. 154(b) by 2629 days.

(21) Appl. No.: 10/526,873

(22) PCT Filed: Sep. 1, 2003

(86) PCT No.: PCT/IB03/03864
§ 371 (c)(1),
(2), (4) Date: Mar. 4, 2005

(87) PCT Pub. No.: WO2004/023818
PCT Pub. Date: Mar. 18, 2004

(65) Prior Publication Data
US 2005/0281294 A1    Dec. 22, 2005

Related U.S. Application Data

(60) Provisional application No. 60/408,956, filed on Sep. 6, 2002, provisional application No. 60/462,776, filed on Apr. 14, 2003.

(51) Int. Cl.
*H04J 3/04*        (2006.01)

(52) U.S. Cl.
USPC ........... 370/535; 370/537; 370/498; 370/476; 714/755

(58) Field of Classification Search
USPC ......... 370/535, 537, 498, 464, 476; 714/755; 708/603
See application file for complete search history.

(56) References Cited

U.S. PATENT DOCUMENTS

| | | | |
|---|---|---|---|
| 6,438,569 B1 * | 8/2002 | Abbott | 708/603 |
| 6,788,710 B1 * | 9/2004 | Knutson et al. | 370/535 |
| 2001/0055342 A1 | 12/2001 | Fimoff | |
| 2002/0041608 A1 * | 4/2002 | Choi et al. | 370/535 |
| 2002/0181581 A1 | 12/2002 | Birru et al. | |
| 2002/0191712 A1 | 12/2002 | Gaddam et al. | |
| 2002/0194566 A1 * | 12/2002 | Bellier et al. | 714/755 |
| 2002/0194570 A1 | 12/2002 | Birru et al. | |
| 2005/0152411 A1 * | 7/2005 | Breti et al. | 370/535 |

* cited by examiner

*Primary Examiner* — Andrew Chriss
*Assistant Examiner* — Jamal Javaid
(74) *Attorney, Agent, or Firm* — Larry Liberchuk (57) ABSTRACT

A packet insertion mechanism at the front end of a time-synchronized digital television transmission system multiplexes, along with standard packets, packets whose payload is to be transmitted with redundancy for added robustness. The multiplexer also inputs placeholder packets to accommodate duplicated content of the robust packets. Multiplexing of the robust and placeholder packets is configured to alternate and to interleave with the multiplexing of standard packets. The distribution of the robust packets within a frame is determined by the number of robust packets.

20 Claims, 4 Drawing Sheets

PACKET INSERTION MECHANISM FOR AN IMPROVED ATSC DTV SYSTEM

This application claims the benefit of U.S. Provisional Application No. 60/408,956, filed Sep. 6, 2002, and U.S. Provisional Application No. 60/462,776, filed Apr. 14, 2003.

The present invention relates to a digital signal transmission system and particularly to multiplexing different types of data, one type replacing another in the multiplexed stream after the multiplexing.

The ATSC standard for digital television (DTV) transmission over terrestrial broadcast channels uses a signal that comprises a sequence of twelve (12) independent time-multiplexed trellis-coded data streams modulated as an eight (8) level vestigial sideband (VSB) symbol stream with a rate of 10.76 MHz. This signal is converted to a six (6) MHz frequency band that corresponds to a standard VHF or UHF terrestrial television channel, over which the signal is broadcast at a data rate of 19.39 million bits per second (Mbps). Details regarding the (ATSC) Digital Television Standard and the latest revision A/53 are available at http://www.atsc.org/.

Figure 1:
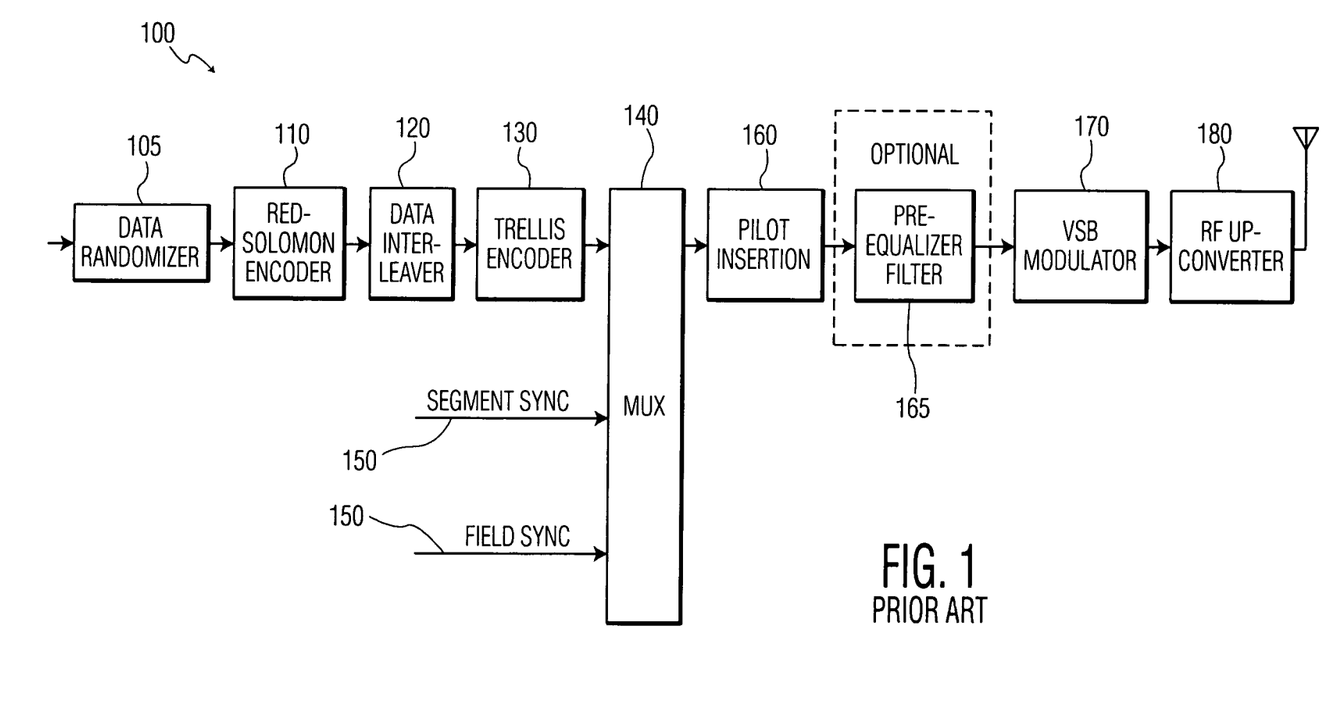
FIG. 1 illustrates a block diagram of an exemplary digital television (DTV) transmitter according to the prior art.

FIG. 1 is a block diagram generally illustrating an exemplary prior art digital television (DTV) transmitter 100. MPEG compatible data packets are first randomized in a data randomizer 105 and each packet is encoded for forward error correction (FEC) by a Reed Solomon (RS) encoder unit 110. A/53 provides that each packet inputted at the system front end corresponds to a segment in a 312-segment field, sometimes referred to hereinafter as a "data field" or "MPEG field." Two fields comprise a frame, each field representing one half of the interlaced video signal received for transmission by the system. After receipt from the encoder unit 110, the data packets in successive segments of each data field are then interleaved by data interleaver 120, and the interleaved data packets are then further interleaved and encoded by trellis encoder unit 130. Trellis encoder unit 130 produces a stream of data symbols having three (3) bits each. One of the three bits is pre-coded and the other two bits are produced by a four (4) state trellis encoder. The three (3) bits are then mapped to an 8-level symbol.

As known, a prior art trellis encoder unit 130 comprises twelve (12) parallel trellis encoder and pre-coder units to provide twelve interleaved coded data sequences. In multiplexer 140 the symbols of each trellis encoder unit are combined with "segment sync" and "field sync" synchronization bit sequences 150 from a synchronization unit (not shown). A small in-phase pilot signal is then inserted by pilot insertion unit 160 and optionally pre-equalized by filter device 165. The symbol stream is then subjected to vestigial sideband (VSB) suppressed carrier modulation by VSB modulator 170. The symbol stream is then finally up-converted to a radio frequency by radio frequency (RF) converter 180.

Figure 2:
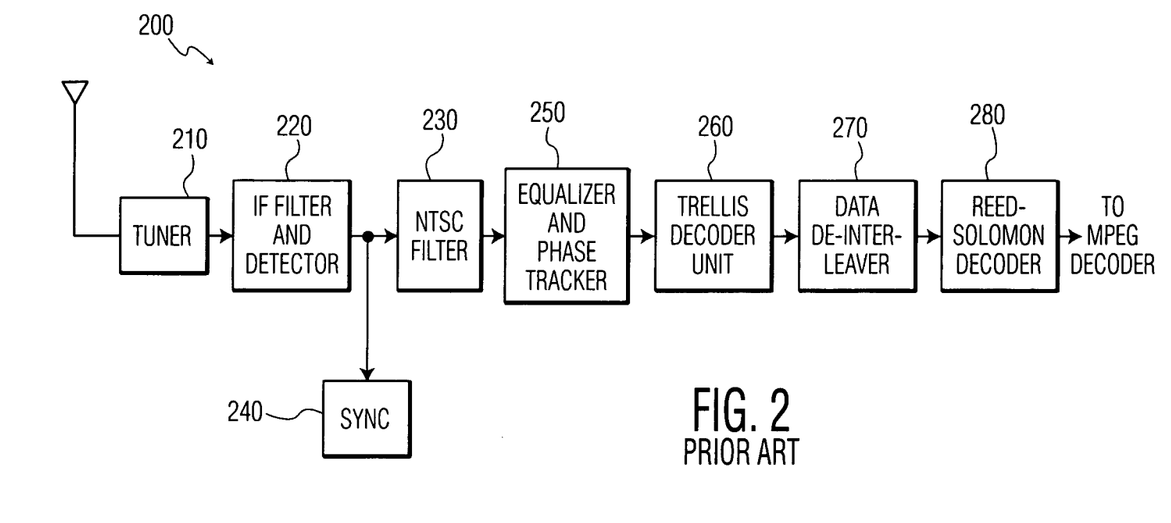
FIG. 2 illustrates a block diagram of an exemplary digital television (DTV) receiver according to the prior art.

FIG. 2 is a block diagram illustrating an exemplary prior art digital television (DTV) receiver 200. The received RF signal is down-converted to an intermediate frequency (IF) by tuner 210. The signal is then filtered and converted to digital form by IF filter and detector 220. The detected signal is then in the form of a stream of data symbols that each signify a level in an eight (8) level constellation. The signal is then provided to NTSC rejection filter 230 and to synchronization unit 240. Then the signal is filtered in NTSC rejection filter 230 and subjected to equalization and phase tracking by equalizer and phase tracker 250. The recovered encoded data symbols are then subjected to trellis decoding by trellis decoder unit 260. The decoded data symbols are then further de-interleaved by data de-interleaver 270. The data symbols are then subjected to Reed Solomon decoding by Reed Solomon decoder 280. This recovers the MPEG compatible data packets transmitted by transmitter 100.

While the existing ATSC 8-VSB A/53 digital television standard is sufficiently capable of transmitting signals that overcome numerous channel impairments such as ghosts, noise bursts, signal fades and interferences in a terrestrial setting, receiving antennas have increasingly been placed indoors, adding to the challenge of delivering a clear signal. There accordingly exists a need for flexibility in the ATSC standard so that streams of varying priority and data rates may be accommodated.

To address these concerns, the present inventors have disclosed an enhancement to the A/53 transmitter that is backward compatible with existing ATSC receivers in commonly-assigned U.S. Patent Publication 2002/0194570, (hereinafter "the '570 application"), the disclosure of which is incorporated by reference as if fully set forth herein.

As described in the '570 application, the present inventors have provided, in an ATSC digital transmission system, a technique for transmitting a new robust bit-stream along with the standard ATSC bit-stream. The threshold of visibility (TOV), i.e., a predetermined acceptable number of packet errors per second at the receiver, for the new bit-stream is typically reached at a lower signal-to-noise ratio (SNR) compared to the standard ATSC stream, so that new bit-stream can be used for transmitting high priority information bits. The inventive ATSC digital transmission system and methodology is backward compatible with existing digital receiver devices.

As the '570 application further discusses, the MPEG data packets of the robust stream have an error correction capability greater than that of the standard stream, with both types of packets being multiplexed at the transmitter front end for concurrent transmission. The order in which they are multiplexed affects the integrity of the resulting wireless signal that arrives at the receiver.

The present application expands on preferred multiplexing techniques for implementation at the enhanced A/53 transmitter front end.

In one aspect, the present invention is directed to a packet insertion mechanism at the front end of an ATSC Digital Television transmitter and methods utilized in the inventive packet insertion.

In a further aspect, the present invention relates to preferred orderings by which packets are multiplexed at the front end of an A/53 transmitter for compatibility with the operations of components in A/53 receivers.

In yet another aspect, the present invention concerns preferred packet multiplexing orderings at the front end of an A/53 transmitter enhanced for backward compatibility with existing receivers.

In accordance with the preferred embodiments of the invention, there is provided a digital transmission apparatus, and method performed by the apparatus, that improves upon the ATSC A/53 DTV signal transmission standard and includes a multiplexer having an output port, an input port for inputting an information bit-stream and an input port for inputting a placeholder bit-stream. The multiplexer multiplexes the bit-streams inputted from the input ports to form a multiplexed bit-stream for output on the output port. The transmission system further includes a data formatter for receiving the multiplexed bit-stream and for replacing bits of the placeholder bit-stream within the received multiplexed bit-stream with bits derived from the information bit-stream within the received multiplexed bit-stream to form a modified bit-stream. An encoder encodes the modified bit-stream to produce an encoded bit-stream, which a transmitter transmits.

Figure 3:
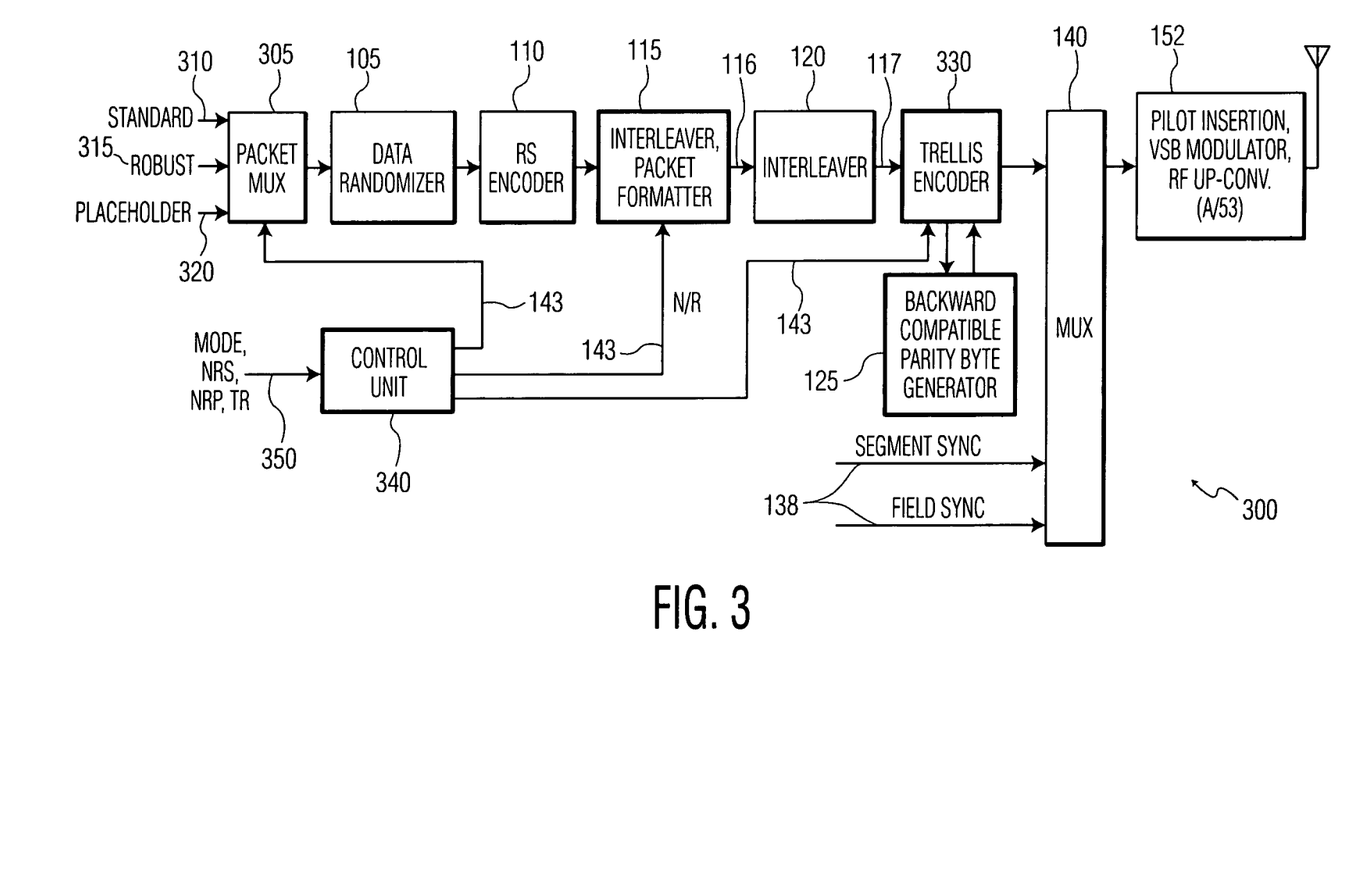
FIG. 3 is a top-level diagram of an embodiment exemplary of the improved ATSC standard according to the present invention.

Details of the invention disclosed herein shall be described below, with the aid of the figures listed below, in which same or similar components are denoted by the same reference numbers over the several views:

FIG. 3 is a top-level diagram of an embodiment 300 of the improved ATSC standard according to the present invention.

The improved ATSC digital signal transmission standard according to a first embodiment includes a packet multiplexer or packet "mux" 305 for selecting among inputted 188-byte MPEG compatible data packets. The mux 305 has a standard input 310 for standard packets of which the standard ATSC bit-stream is comprised. The standard packets, after transmission from the back end of the system 300, are received by existing A/53 receivers and new receivers. A robust input 315 receives robust packets which make up the new robust bit-stream. The robust packets are received, after transmission from the back end, by the new receiver disclosed in commonly owned, co-pending U.S. Patent Application Publication No. U.S. 2002/0191712 (hereinafter "the '712 application") entitled PACKET IDENTIFICATION MECHANISM AT THE TRANSMITTER AND RECEIVER FOR AN ENHANCED ATSC 8-VSB SYSTEM, the whole contents and disclosure of which is incorporated by reference as if fully set forth herein. Existing receivers decode the signal that was generated at the transmitter based on the robust packets but either ignore them or process them as errors, depending on backward compatibility as discussed in more detail further below. Multiplexing of these two types of packets, standard and robust, at the front end of the transmission system is disclosed by the current inventors in the '570 application, which as mentioned above is fully incorporated by reference herein.

A third type of packet, the placeholder packet, is received over the placeholder input 320 and preferably consists of all null values. The existing ATSC standard accommodates null packets, for example as a means by which to resolve clocking frequencies of connecting components within the transmission system. In an aspect of the present invention, the placeholder packets inputted at the front end are overwritten with data subsequently generated or derived based on the contents of inputted robust packets.

The improved ATSC transmission system 300 further includes the data randomizer element 105 for receiving the multiplexed output of the packet mux 305 and for first changing the input data byte value according to a known pattern of pseudo-random number generation. According to the ATSC standard, for example, the data randomizer XORs all the incoming data bytes with a 16-bit maximum length pseudo random binary sequence (PRBS) which is initialized at the beginning of a data field.

The output randomized data is then input to the Reed Solomon (RS) encoder element 110 which operates on a data block size of 187 bytes, and adds twenty (20) RS parity bytes for error correction to result in a RS block size total of 207 bytes transmitted per data segment.

After the RS encoding, the 207 byte data segment is then input to a new block 115 comprising a robust interleaver, packet formatter and packet multiplexer elements for further processing/reformatting the robust input bytes. Operation of the individual elements of the packet formatter block is described in greater detail in commonly owned, co-pending U.S. Patent Application Publication No. U.S. 2002/0181581 (hereinafter "the 581 application") entitled IMPROVED ATSC DIGITAL TELEVISION SYSTEM.

Most generally, the robust interleaver, packet formatter and packet multiplexer elements for reformatting incoming bytes are responsive to a mode signal 143 which indicates whether the incoming byte is processed (for robust bytes) or not (for normal bytes). After interleaving robust packets in the robust interleaver, the data bytes belonging to the incoming robust bit-stream are buffered and grouped in the packet formatter device into groups of a pre-defined number of bytes, e.g., 207 bytes. In general, for robust packets, only 4 bits of each byte at the packet formatter output, the LSBs (6, 4, 2, 0), correspond to the incoming stream. The other 4 bits of each byte, the MSBs (7, 5, 3, 1), may be set to any value for reasons as will be explained in greater detail herein. After byte re-formatting in the packet formatter 115, the bytes belonging to robust packets are multiplexed with the bytes belonging to the standard stream.

The multiplexed stream 116 of robust and standard bytes are next input to the convolutional interleaver mechanism 120 where data packets in successive segments of each data field are further interleaved for scrambling the sequential order of the data stream according to the ATSC A/53 standard. As explained in greater detail in the '570 application, bytes associated with each robust packet or standard packet are tracked in concurrent processing control blocks (not shown).

The interleaved, RS-encoded and formatted data bytes 117, i.e., the output of the "data formatter" which includes modules 105 through 120, are then trellis coded by a novel trellis encoder device 330. Trellis encoder unit 330 is particularly responsive to the mode signal 143 and cooperatively interacts with a backwards compatibility parity-byte generator element 125, herein referred to as a backward compatibility (optional RS encoder) block 125, in the manner explained in greater detail in the '570 application to produce an output trellis encoded output stream of data symbols having three (3) bits each mapped to an 8-level symbol. The trellis encoded output symbols are then transmitted to multiplexer unit 140 where they are combined with the "segment sync" and "field sync" synchronization bit sequences 138 from a synchronization unit (not shown).

The system 300 further includes a backend processor 152 that incorporates the pilot insertion 160, VSB modulator 170 and RF Up-Converter 180 of the prior art as illustrated in FIG. 1. Accordingly, a pilot signal is inserted into the output signal of the mux 140. The symbol stream is then subjected to vestigial sideband (VSB) suppressed carrier modulation and the symbol stream is then finally up-converted to a radio frequency.

Also included in the system 300 is a control unit 340 that operates in accordance with the embodiment of FIG. 3 of the '712 application and the embodiment depicted in FIGS. 5 through 7 in the '570 application. The control unit 340 of the present invention has two new modifications. First, the mode signal 143, which has a value of either "normal" or "robust," is fed to the packet mux 305 newly-disclosed herein. Second, the set of parameters for input to the control unit 340 on input line 350 has been revised.

Output communicated by the control unit 340 with the various modules of system 300 is not limited to the connections shown in FIG. 3. The mux 305, for example, receives from the control unit 340 a mode selection bit which, in combination with the mode signal, determines which of the three inputs 310, 315, 320 are selected. As a further example, the packet formatter and the trellis encoder 330 both likewise receive from the control unit 340 a mode bit, which in addition to the mode signal 143 defines the system parameter MODE. Also, as will be clear from the discussion below, the packet formatter 115 requires the other three system parameters NRS, NRP and TR as well, and inputs them from the control unit 340.

The system parameters MODE, NRS, NRP and TR determine the number and position of robust packets in an MPEG field. The term "robust packets" as used hereinafter in the context of front end multiplexer input will refer to either placeholder packets or "robust information packets," i.e. what have up until now been termed "robust packets." Therefore, the number of robust packets multiplexed by the packet mux 305 is equal to the sum of the number of robust information packets multiplexed and the number of placeholder packets multiplexed.

The system parameters, MODE, NRS, NRP and TR, can be modified once every two fields, i.e. once per frame.

The MODE parameter is defined below in TABLE 1:

TABLE 1

Description of the MODE parameter

| MODE | Description |
|------|-------------|
| 00 | Standard. No robust packets in the field |
| 01 | H-VSB mode |
| 10 | E-VSB mode |
| 11 | Pseudo 2-VSB mode |

Mode O denotes the processing of standard packets. The existing A/53 standard outputs an 8-level symbol for every two bits, i.e., three bits for two bits, or so-called "2/3 trellis coding." During mode 0, the other three system parameters NRS, NRP, TR are not utilized, and can be ignored. Details regarding trellis coding for the various modes in TABLE I are further disclosed in the '570 and '581 applications.

For, H-VSB (hierarchical vestigial sideband) mode, mode 1, corresponding bits of a robust information packet and of an embedded packet are placed side-by-side and fed as a pair to a pair of input terminals to the trellis encoder 330. An embedded packet is a constituent of an embedded bit-stream, which is a low-priority stream inputted in place of the placeholder bit-stream on input 320 of the packet mux 305. Accordingly, the LSBs (6, 4, 2, 0) are transferred or derived from the embedded byte, i.e. a byte from an embedded packet, and the MSBs (7, 5, 3, 1) are derived from the robust bytes of robust information packets. The symbol outputted by the trellis encoder 330 has 6 levels that, due to the increased spread between the lower magnitude levels, provide greater robustness than do the standard 8 levels.

Enhanced vestigial sideband (E-VSB) mode, mode 2, yields an 8-level symbol for every information bit. Redundancy in conveying the bit makes its transmission more robust, in exchange for a lower information output rate.

Pseudo 2-VSB mode or simply "2-VSB mode," by contrast, outputs a 4-level symbol for every information bit, for greater redundancy and robustness than in transmission of standard packets.

TABLE 2 below describes the NRS parameter:

TABLE 2

Description of the NRS parameter

| NRS | Description |
|-----|-------------|
| 0 | Backward Compatible Parity Byte Generator (BCPBG) is not used |
| 1 | Backward Compatible Parity Byte Generator (BCPBG) is used |

In accordance with the present invention, existing receivers will deliver to the recipient only that information conveyed by standard packets. New receivers, by contrast, will receive and decode signals representative of robust information encoded in modes 2 or 3, and optionally in mode 1 if the signal is being received with sufficient integrity. New receivers will also receive and decode the standard bit-stream as an "additional bit-stream" for subsequent decoding.

If NRS=0, backward compatibility is not being furnished by the generator 125, and the existing receiver therefore rejects as erroneous all incoming robust packets, i.e., signaling decoded into robust packets. Before rejecting, however, the receiver attempts forward error correction, a capability afforded by both the RS and the trellis encoding. This wasted effort by the conventional receiver is relieved if the robust packets are processed for backward compatibility, i.e., when NRS is set equal to 1, since, in that case, the receiver ignores the robust packet instead of recognizing it as an error.

The TR parameter is discussed below in conjunction with TABLE 3:

TABLE 3

Description of the TR parameter

| TR | Description |
|----|-------------|
| 0 | Rate-½ coding system |
| 1 | Rate-¼ coding system |

For standard packets, two bits are encoded to produce one symbol, as mentioned above. When TR=0, the coding rate is "1/2" and one bit is encoded per symbol. Ordinarily, for example, the coding rate is "1/2" for pseudo 2-VSB mode. By contrast, when TR=1, the coding rate is "1/4" which means that one bit is encoded to produce two coding symbols. Therefore, for example, each symbol selected by the trellis encoder 330 operating in mode=11 and TR=1 may be duplicated, with both symbols being transmitted.

The NRP parameter is a code that specifies the number of robust information packets $N_{RI}$ per frame, the number being determined from TABLE 4 below.

TABLE 4

Description of the NRP parameter

| | Number of robust packets before encoding | | | |
|---|---|---|---|---|
| NRP | NRS = 0, TR = 0 | NRS = 1, TR = 0 | NRS = 0, TR = 1 | NRS = 1, TR = 1 |
| 0000 | 0 | 0 | 0 | 0 |
| 0001 | 2 | 4 | 1 | 2 |
| 0010 | 3 | 8 | Not defined | 4 |

TABLE 4-continued

Description of the NRP parameter

Number of robust packets before encoding

| NRP | NRS = 0, TR = 0 | NRS = 1, TR = 0 | NRS = 0, TR = 1 | NRS = 1, TR = 1 |
|---|---|---|---|---|
| 0011 | 4 | 12 | 2 | 6 |
| 0100 | 6 | 16 | 3 | 8 |
| 0101 | 8 | 20 | 4 | 10 |
| 0110 | 12 | 24 | 6 | 12 |
| 0111 | 16 | 28 | 8 | 14 |
| 1000 | 20 | 32 | 10 | 16 |
| 1001 | 26 | 40 | 13 | 20 |
| 1010 | 32 | 52 | 16 | 26 |
| 1011 | 39 | 64 | 18 | 32 |
| 1100 | 52 | 72 | 26 | 36 |
| 1101 | 78 | 76 | 39 | 38 |
| 1110 | 104 | 96 | 52 | 48 |
| 1111 | 156 | 120 | 78 | 60 |

The number of robust packets $N_R$ can be determined from the value of $N_{RI}$ read from TABLE 4 by the following formulas (1) to (4):

$$\text{When } TR=0, NRS=0, N_R=2*N_{RI} \quad (1)$$

$$\text{When } TR=0, NRS=1, N_R=(9/4)*N_{RI} \quad (2)$$

$$\text{When } TR=1, NRS=0, N_R=4*N_{RI} \quad (3)$$

$$\text{When } TR=1, NRS=1, N_R=(9/2)*N_{RI} \quad (4)$$

where the number of placeholder packets $N_{PH}=N_R-N_{RI}$, as explained more fully below.

Generally speaking, robust packets are distributed uniformly in an MPEG field. One constraint is that the maximum distance between any two robust packets is no more than 4 packets. In other words, over a predetermined number of packets in the field, counting from the first packet to the last robust packet, no more than 3 standard packets are to be multiplexed by the packet mux 305 consecutively. Since, as mentioned, the embedded bit-stream at the system 300 front end replaces the placeholder bit-stream when an embedded stream is used, the description will hereinafter refer to placeholder packets with the understanding that either placeholder or embedded packets are implied.

Uniform distribution of the robust packets at the front end is desirable for the following reasons. The fewer levels of the robust signal make it easier for the equalizer in the receiver to converge, by resolving multipath or otherwise correctly determining signal values. If, however, the supply of robust signals is not continuous, i.e. is irregularly spaced in time, this advantage at the receiver is lost. On the other hand, long sequences of one type, i.e., all robust or all standard, create complications for the automatic gain control (AGC) in the receiver. Accordingly, robust packets are interleaved with the standard packets uniformly.

The distance $d_R$ between any two consecutive robust packets in a field is given by equation (5):

$$d_R = \min(\text{floor}(N/N_R), 4) \quad (5)$$

where floor is a function that truncates the fraction and leaves the integer value, N is the total number of packets in a field, 312, and $N_R$, as mentioned above, is the number of robust packets.

Although a maximum value of 4 for $d_R$ has empirically been found to be suitable, other maximum values may be used.

Another limitation in configuring the packet ordering is that the first packet of a field is always a robust packet if NRP>0. The packet mux 305, in selecting among the standard, robust and placeholder inputs 310, 315, 320, can switch among the sources once per packet.

Packet Insertion when NRS=0 and TR=0

Operating under these parameters, the packet formatter 115 duplicates the bits of each robust information packet to form two packets. Accordingly, each robust information packet received at the packet mux 305 is followed by a placeholder packet, which is overwritten to accommodate the increased number of bits, i.e., the original bits plus the duplicate or derived bits.

Figure 4:
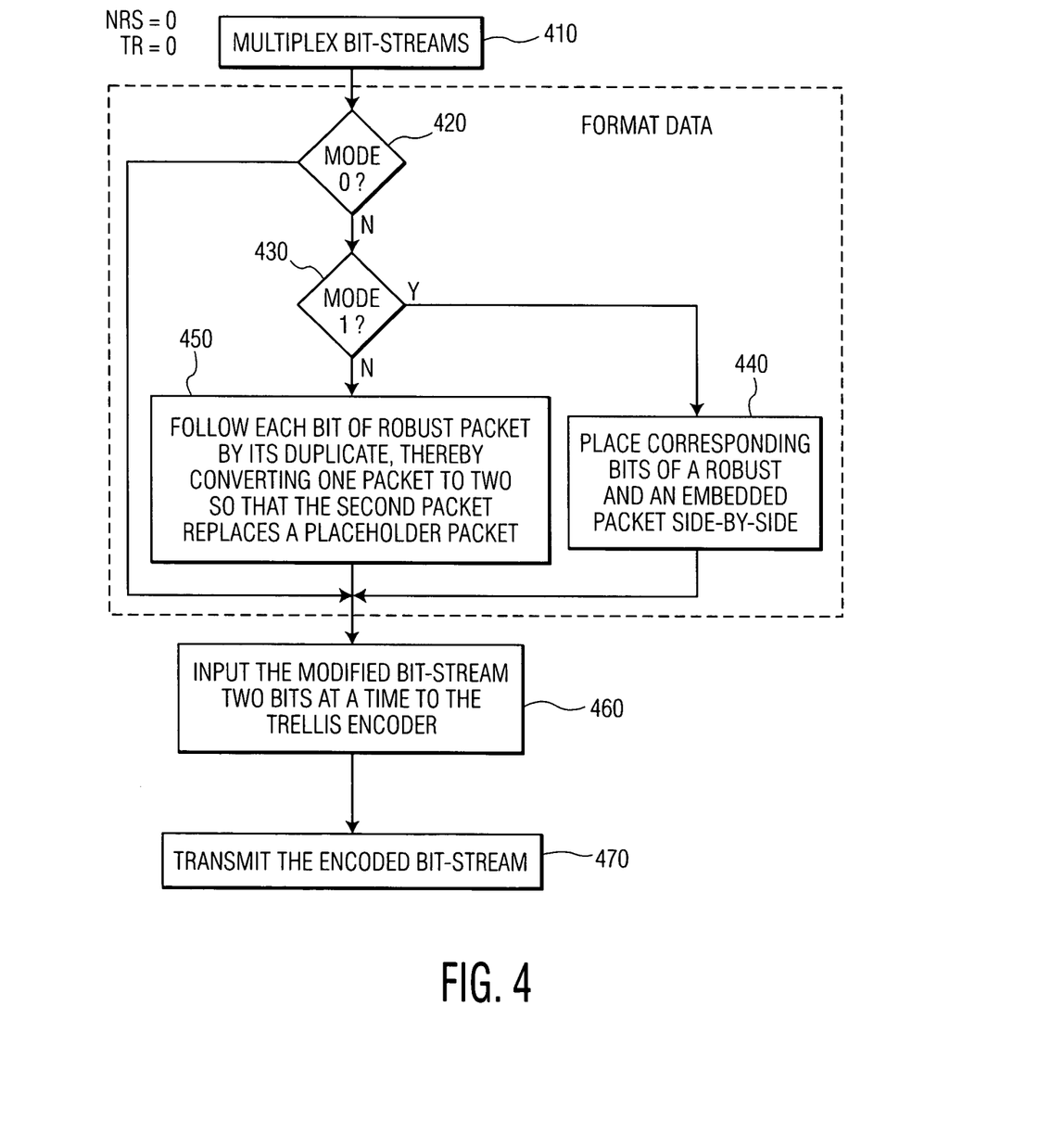
FIG. 4 is a flow diagram representative of methods utilized according to the present invention.

FIG. 4 is a flow chart showing one example of a digital signal transmission method in accordance with the present invention for the case where NRS=0, TR=0. The bit-streams are multiplexed from the standard, robust and placeholder inputs 310, 315, 320 (step 410). If MODE=0 (step 420), indicating a standard packet, a replacing step to be described is bypassed. If MODE=1 (step 430), indicating utilization of embedded packets, corresponding bits of a robust information packet and an embedded packet are placed side-by-side (step 440), as shown in FIG. 9(a) of the '570 application. If, on the other hand, MODE=2 or 3, each bit of the robust information packet is duplicated in a replacing step (step 450). The duplicated or derived bit is disposed to follow the bit from which derivation has occurred, as shown in FIG. 8(a) of the '570 application. After the bit manipulation or its bypassing has occurred in forming a modified bit-stream, the modified bit-stream is inputted two bits at a time to the trellis encoder 330 (step 460) and the encoded stream is transmitted (step 470).

Steps 420 to 450 are performed by the data formatter (modules 105 to 120 in FIG. 3). Accordingly, in a preferred embodiment of the invention as shown in FIG. 3, other steps precede and follow the bit manipulation steps 440, 450 as disclosed hereinabove.

Referring again to TABLE 4 for another example of its utilization, if NRP=0110 and MODE=11, each MPEG field will have 12 robust information packets and 12 placeholder packets, as well as (312−24)=288 standard packets. The spacing between two successive robust packets, as calculated from equation (5) is $d_R=\min(\text{floor}(312/24),4)=4$. The robust packets are therefore distributed uniformly with a distance of 4 packets between any two successive robust packets, as demonstrated below in TABLE 5:

TABLE 5

Packet insertion mechanism at the Randomizer input for NRS = 0 (example 1)

| Packet # | Packet type |
|---|---|
| 0 | Robust Info |
| 1 | Standard |
| 2 | Standard |
| 3 | Standard |
| 4 | Place Holder |
| 5 | Standard |
| 6 | Standard |
| 7 | Standard |
| 8 | Robust Info |
| 9 | Standard |
| 10 | Standard |
| ... | ... |
| 86 | Standard |
| 87 | Standard |
| 88 | Robust Info |

TABLE 5-continued

Packet insertion mechanism at the Randomizer input for NRS = 0 (example 1)

| Packet # | Packet type |
|---|---|
| 89 | Standard |
| 90 | Standard |
| 91 | Standard |
| 92 | Place Holder |
| 93 | Standard |
| 94 | Standard |
| 95 | Standard |
| 96 | Standard |
| 97 | Standard |
| 98 | Standard |
| 99 | Standard |
| 100 | Standard |
| ... | ... |
| 304 | Standard |
| 305 | Standard |
| 306 | Standard |
| 307 | Standard |
| 308 | Standard |
| 309 | Standard |
| 310 | Standard |
| 311 | Standard |

In another example, if NRP=110 and MODE=11, each MPEG field will have 52 robust information packets, 52 placeholder packets and (312−104)=208 standard packets. The spacing between successive robust packets is then $d_R=\min(\text{floor}(312/104),4)=3$, as can be seen from TABLE 6 below:

TABLE 6

Packet insertion mechanism at the Randomizer input for NRS = 0 (example 2)

| Packet # | Packet type |
|---|---|
| 0 | Robust Info |
| 1 | Standard |
| 2 | Standard |
| 3 | Place Holder |
| 4 | Standard |
| 5 | Standard |
| 6 | Robust Info |
| 7 | Standard |
| 8 | Standard |
| 9 | Place Holder |
| 10 | Standard |
| ... | ... |
| 86 | Standard |
| 87 | Place Holder |
| 88 | Standard |
| 89 | Standard |
| 90 | Robust Info |
| 91 | Standard |
| 92 | Standard |
| 93 | Place Holder |
| 94 | Standard |
| 95 | Standard |
| 96 | Robust Info |
| 97 | Standard |
| 98 | Standard |
| 99 | Place Holder |
| 100 | Standard |
| ... | ... |
| 304 | Standard |
| 305 | Standard |
| 306 | Robust Info |
| 307 | Standard |
| 308 | Standard |
| 309 | Place Holder |
| 310 | Standard |
| 311 | Standard |

Packet Insertion when NRS=1 and TR=0

In this modality, the packet formatter 115 adds 23 additional bytes to each output robust packet to satisfy backward compatibility requirements. The 207 bytes of a robust information packet are accordingly converted into 2*207+2*23=460 bytes by the packet formatter 115. To accommodate this data, the packet formatter 115 converts each 4 robust information packets into 9 robust packets, by utilizing 5 placeholder packets. To avoid additional overhead, the number of robust information packets per field is preferably limited to a multiple of 4.

An ordering for robust information packets in relation to placeholder packets, and ignoring for the moment the standard packets, is shown below in TABLE 7:

TABLE 7

Ordering in a group of 9 robust packets

| Robust Packet # | Packet type |
|---|---|
| 0 | Robust Info |
| 1 | Place Holder |
| 2 | Robust Info |
| 3 | Place Holder |
| 4 | Robust Info |
| 5 | Place Holder |
| 6 | Robust Info |
| 7 | Place Holder |
| 8 | Place Holder |

This pattern repeats for every 9 robust packets. By successive alternating by type, instead of clustering consecutively by type, the robust information and placeholder packets are ordered to avoid delay in subsequent transmission of the information signal. That is, the packet formatter 115 utilizes three packets at output to carry the complete content of one robust information packet, and therefore preferably receives a steady supply of placeholder packets, as more fully described in the '570 application in conjunction with FIG. 10.

In a first example for NRP=1000, MODE=11, each MPEG field has 32 robust information packets, 40 placeholder packets and (312−72)=240 standard packets. The spacing between robust packets is therefore $d_R=\min(\text{floor}(312/72),4)=4$, as illustrated below in TABLE 8:

TABLE 8

Packet insertion mechanism at the Randomizer input for NRS = 1 (example 1)

| Packet # | Packet type |
|---|---|
| 0 | Robust Info |
| 1 | Standard |
| 2 | Standard |
| 3 | Standard |
| 4 | Place Holder |
| 5 | Standard |

TABLE 8-continued

Packet insertion mechanism at the Randomizer input for NRS = 1 (example 1)

| Packet # | Packet type |
|---|---|
| 6 | Standard |
| 7 | Standard |
| 8 | Robust Info |
| 9 | Standard |
| 10 | Standard |
| 11 | Standard |
| 12 | Place Holder |
| 13 | Standard |
| 14 | Standard |
| 15 | Standard |
| 16 | Robust Info |
| 17 | Standard |
| 18 | Standard |
| 19 | Standard |
| 20 | Place Holder |
| 21 | Standard |
| 22 | Standard |
| 23 | Standard |
| 24 | Robust Info |
| 25 | Standard |
| 26 | Standard |
| 27 | Standard |
| 28 | Place Holder |
| 29 | Standard |
| 30 | Standard |
| 31 | Standard |
| 32 | Place Holder |
| 33 | Standard |
| 34 | Standard |
| 35 | Standard |
| 36 | Robust Info |
| 37 | Standard |
| 38 | Standard |
| . | . |
| . | . |
| . | . |
| 280 | Place Holder |
| 281 | Standard |
| 282 | Standard |
| 283 | Standard |
| 284 | Place Holder |
| 285 | Standard |
| 286 | Standard |
| . | . |
| . | . |
| . | . |
| 306 | Standard |
| 307 | Standard |
| 308 | Standard |
| 309 | Standard |
| 310 | Standard |
| 311 | Standard |

In a second example, with NRP=1011, MODE=11, each MPEG field has 64 robust information packets, 80 placeholder packets and (312−144)=168 standard packets. The robust packet spacing is therefore $d_R$=min(floor(312/144),4)=2, as shown below in TABLE 9:

TABLE 9

Packet insertion mechanism at the Randomizer input for NRS = 1 (example 2)

| Packet # | Packet type |
|---|---|
| 0 | Robust Info |
| 1 | Standard |
| 2 | Place Holder |
| 3 | Standard |
| 4 | Robust Info |
| 5 | Standard |
| 6 | Place Holder |
| 7 | Standard |
| 8 | Robust Info |
| 9 | Standard |
| 10 | Place Holder |
| 11 | Standard |
| 12 | Robust Info |
| 13 | Standard |
| 14 | Place Holder |
| 15 | Standard |
| 16 | Place Holder |
| 17 | Standard |
| 18 | Robust Info |
| 19 | Standard |
| 20 | Place Holder |
| 21 | Standard |
| 22 | Robust Info |
| 23 | Standard |
| 24 | Place Holder |
| 25 | Standard |
| 26 | Robust Info |
| 27 | Standard |
| 28 | Place Holder |
| 29 | Standard |
| 30 | Robust Info |
| 31 | Standard |
| 32 | Place Holder |
| 33 | Standard |
| 34 | Place Holder |
| 35 | Standard |
| 36 | Robust Info |
| 37 | Standard |
| 38 | Place Holder |
| . | . |
| . | . |
| . | . |
| 280 | Place Holder |
| 281 | Standard |
| 282 | Robust Info |
| 283 | Standard |
| 284 | Place Holder |
| 285 | Standard |
| 286 | Place Holder |
| 287 | Standard |
| 288 | Standard |
| . | . |
| . | . |
| . | . |
| 308 | Standard |
| 309 | Standard |
| 310 | Standard |
| 311 | Standard |

Packet Insertion when TR=1

As indicated in TABLE 4, the number of robust information packets when TR=1 is equal to half that when TR=0; yet, the number of robust packets remains the same. The packet insertion accordingly is as indicated in TABLES 5 through 9, except that every other robust information packet is replaced by a placeholder packet.

While there have been shown and described what are considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A digital signal transmission apparatus comprising:
a multiplexer having an output port, an input port for inputting an information bit-stream and an input port for inputting a placeholder bit-stream, for multiplexing the bit-streams inputted from the input ports to form a multiplexed bit-stream for output on the output port;
a data formatter for receiving the multiplexed bit-stream and for replacing bits of said placeholder bit-stream within the received multiplexed bit-stream with bits derived from said information bit-stream within said received multiplexed bit-stream to form a modified bit-stream;
an encoder for encoding the modified bit-stream to produce an encoded bit-stream; and
a transmitter for transmitting the encoded bit-stream.

2. The apparatus of claim 1, wherein the deriving creates a new bit, but retains any bit from which derivation has occurred.

3. The apparatus of claim 2, wherein said replacing comprises duplicating bits of said information bit-stream within said received multiplexed bit-stream to form duplicate bits and substituting the duplicate bits to replace bits of said placeholder bit-stream within said received multiplexed bit-stream.

4. The apparatus of claim 1, wherein the multiplexer is configured to multiplex an additional bit-stream in forming said multiplexed bit-stream, the data formatter is configured to bypass said replacing when operating on said additional bit-stream within said received multiplexed bit-stream to form said modified bit-stream, and the encoder is configured to process every bit of said modified bit-stream when operating on bits derived from said additional bit-stream and to process every other bit of said modified bit-stream when operating on bits derived from said information bit-stream.

5. The apparatus of claim 1, wherein the multiplexer is configured with an additional input port for inputting an additional bit-stream.

6. The apparatus of claim 5, the multiplexer being configured to input a plurality of additional bit-streams, a plurality of information bit-streams and a plurality of placeholder bit-streams through their respective input ports for said multiplexing to form said multiplexed bit-stream, each of the information bit-streams to be multiplexed by the multiplexer having an identical number of bits, each of the placeholder bit-streams to be multiplexed by the multiplexer having an identical number of bits, the multiplexer being configured to multiplex each of the information and placeholder bit-streams for their respective identical number of bits before selecting another bit-stream for multiplexing.

7. The apparatus of claim 6, wherein said multiplexer is further configured to perform said multiplexing so as to select in succession, over a predetermined number of bit-streams, no more than three of said additional bit-streams.

8. The apparatus of claim 6 wherein said multiplexer is further configured to perform said multiplexing so as to input in succession one or more of the additional bit-streams after each input of one of an information bit-stream and a placeholder bit-stream.

9. The apparatus of claim 8, wherein the plural bit-streams are identical in length, and the inputting of one of an information bit-stream and a placeholder bit-stream successively alternates, over at least most inputs of the one information or placeholder bit-stream, between an information bit-stream and a placeholder bit-stream.

10. The apparatus of claim 1, wherein said replacing comprises removing selected bits from said information bit-stream within said received multiplexed bit-stream and substituting the removed bits to replace bits of said placeholder bit-stream within said received multiplexed bit-stream.

11. A digital signal transmission method comprising:
multiplexing an information bit-stream and a placeholder bit-stream to form a multiplexed bit-stream;
receiving the multiplexed bit-stream;
replacing bits of said placeholder bit-stream within the received multiplexed bit-stream with bits derived from said information bit-stream within said received multiplexed bit-stream to form a modified bit-stream;
encoding the modified bit-stream to produce an encoded bit-stream; and
transmitting the encoded bit-stream.

12. The method of claim 11, wherein the deriving creates a new bit, but retains any bit from which derivation has occurred.

13. The method of claim 12, wherein the replacing comprises:
duplicating bits of said information bit-stream within said received multiplexed bit-stream to form duplicate bits; and
substituting the duplicate bits to replace bits of said placeholder bit-stream within said received multiplexed bit-stream.

14. The method of claim 11, further comprising:
multiplexing an additional bit-stream in forming said multiplexed bit-stream; and
bypassing said replacing step when operating on said additional bit-stream within said received multiplexed bit-stream to form said modified bit-stream;
wherein said encoding further comprises:
processing every bit of said modified bit-stream when operating on bits derived from said additional bit-stream; and
processing every other bit of said modified bit-stream when operating on bits derived from said information bit-stream.

15. The method of claim 11, wherein the multiplexing further comprises multiplexing an additional bit-stream to form said multiplexed bit-stream.

16. The method of claim 15, wherein said multiplexing comprises multiplexing a plurality of additional bit-streams, a plurality of information bit-streams, and a plurality of placeholder bit-streams to form said multiplexed bit-stream, each of said information bit-streams to be multiplexed by the multiplexer having an identical number of bits, each of said placeholder bit-streams to be multiplexed by the multiplexer having an identical number of bits, the multiplexing step being performed so as to multiplex each of the information and placeholder bit-streams for their respective identical number of bits before selecting another bit-stream for multiplexing.

17. The method of claim 16, wherein said multiplexing is performed so as to select in succession, over a predetermined number of bit-streams, no more than three of said additional bit-streams.

18. The method of claim 16 wherein the multiplexing multiplexes so as to input in succession one or more of the additional bit-streams after each input of one of an information bit-stream and a placeholder bit-stream.

19. The method of claim 18, wherein the plural bit-streams are identical in length, and the inputting of one of an information bit-stream and a placeholder bit-stream successively alternates, over at least most inputs of the one information or placeholder bit-stream, between an information bit-stream and a placeholder bit-stream.

20. The method of claim 11, wherein the replacing comprises:
- selecting bits from said information bit-stream within said received multiplexed bit-stream;
- removing the selected bits from said information bit-stream within said multiplexed bit-stream; and
- substituting the removed bits to replace bits of said placeholder bit-stream within said received multiplexed bit-stream.

\* \* \* \* \*